United States Patent [19]

Sloan

[11] Patent Number: 4,902,956
[45] Date of Patent: Feb. 20, 1990

[54] SAFETY DEVICE TO PREVENT EXCESSIVE BATTERY DRAIN

[76] Inventor: Jeffrey M. Sloan, 1082 Woodkrest Dr., Flint, Mich. 48532

[21] Appl. No.: 272,427

[22] Filed: Nov. 17, 1988

Related U.S. Application Data

[63] Continuation-in-part of Ser. No. 940,863, Dec. 12, 1986, abandoned.

[51] Int. Cl.⁴ .................... H02G 3/00; H02H 7/18; H02J 7/00
[52] U.S. Cl. .................... 320/13; 307/10.7; 320/40
[58] Field of Search .................... 320/13, 40; 307/10, 307/10.BP; 322/7, 8

[56] References Cited

U.S. PATENT DOCUMENTS

| | | | |
|---|---|---|---|
| 3,127,518 | 3/1964 | Pruitt | 290/50 |
| 3,172,400 | 3/1965 | Hale | 123/179 |
| 3,395,288 | 7/1968 | von Brimer | 320/40 X |
| 3,497,707 | 2/1970 | Stewart | 307/9 |
| 3,646,354 | 2/1972 | von Brimer | 320/40 X |
| 3,668,154 | 6/1972 | Peck | 322/28 |
| 3,763,415 | 10/1973 | Ownby | 320/6 |
| 3,829,753 | 8/1974 | Marshall | 320/6 |
| 3,852,732 | 12/1974 | Yorksie et al. | 320/40 |
| 3,967,133 | 6/1976 | Bokern | 307/10 R |
| 4,090,122 | 5/1978 | Hoinski | 320/6 |
| 4,127,782 | 11/1978 | Omura et al. | 307/10 R |
| 4,149,093 | 4/1979 | D'Allesio et al. | 320/40 X |
| 4,153,869 | 5/1979 | Ragaly | 322/90 |
| 4,161,684 | 7/1979 | Ragaly | 322/90 |
| 4,258,305 | 3/1981 | Anglin | 320/2 |
| 4,282,475 | 8/1981 | Milton | 320/6 |
| 4,493,001 | 1/1985 | Sheldrake | 320/13 X |
| 4,509,005 | 4/1985 | Stroud | 320/68 |
| 4,516,066 | 5/1985 | Nowakowski | 320/15 |

Primary Examiner—R. J. Hickey
Attorney, Agent, or Firm—Gifford, Groh, Sheridan, Sprinkle and Dolgorukov

[57] ABSTRACT

A safety device is wired in series with selected accessories in a wiring circuit for a vehicle. The safety device of the present invention determines the state of charge of the battery as a function of the rate of discharge of the battery. When the state of charge falls below preset values, the device activates a switch which disconnects the battery from the vehicle wiring circuit in order to save sufficient energy for engine ignition. In another embodiment, a programmed microprocessor activates electronic switches to sequentially disconnect banks of accessories from the battery.

26 Claims, 5 Drawing Sheets

SAFETY DEVICE TO PREVENT EXCESSIVE BATTERY DRAIN

CROSS REFERENCE TO RELATED APPLICATIONS

This application is a continuation-in-part of U.S. patent application Ser. No. 940,863 entitled Safety Device to Prevent Excessive Battery Drain, filed on Dec. 12, 1986 and now abandoned.

BACKGROUND OF THE INVENTION

I. Field of the Invention

This invention relates to battery safety devices and, in particular, to a safety device for use in motor vehicles which interrupts current to certain non-essential accessories when the battery voltage drops below a predetermined minimum level, in order to preserve sufficient current to run the starter motor to start the engine.

II. Description of the Prior Art

The problem of accessory current drain on a battery has been handled a number of different ways previously. In order to ensure that the battery retains sufficient power to drive the starter motor, and thereby to start the engine, one must guard against excessive current drain caused by various accessories. U.S. Pat. No. 3,763,415 to Ownby discloses a system whereby two batteries are employed. A first or primary battery provides electrical power for the starter motor which, in turn, starts the engine of the vehicle. A second or auxiliary battery provides electrical power for the accessories such as lights and radios. Both batteries are recharged when the engine is running, but only the auxiliary battery is drained by excessive use of the accessories, leaving intact the primary battery power.

A similar two battery system is disclosed in U.S. Pat. No. 3,829,753 to Marshall. Both batteries are again charged while the engine is running, however, a switch disconnects the secondary battery from the electrical system when the engine stops. This preserves a secondary source of electrical power which can then be used to start the engine if the primary battery becomes drained.

U.S. Pat. No. 3,967,133 to Bokern discloses a portable power supply means which is adapted to draw power from an automotive battery. Bokern's power device includes a circuit having a series of resistors and output taps disposed at various increments to provide outputs of predetermined convenient voltages. An indicator lamp remains lit when current is flowing through the output device. A zener diode prevents current from reaching the various outputs if the voltage of the automotive battery supply drops below 11.8 volts.

However, the Bokern device draws its electrical power through the cigarette lighter of an automobile, and the reduced electrical voltages are intended to power transistor radios, lights, electric shavers, fish finder devices, and other electrical devices unrelated to the accessories of the automobile.

The dual battery systems of Ownby and Marshall are disadvantageous because of the additional weight and bulk of the additional battery. Moreover, the Bokern device will not prevent the automobile's accessories from draining the primary automotive battery. These and other disadvantages are overcome by the present invention.

SUMMARY OF THE PRESENT INVENTION

A safety device according to the present invention comprises a voltmeter and a circuit breaker wired in series with selected accessories of a motor vehicle. The accessories, in turn, are wired in parallel with each other and with the starter motor. In one embodiment, the starter motor, however, is wired directly to the battery without a circuit breaker or safety device. The device may be located directly adjacent the battery or, alternatively, may be located remotely therefrom.

Since the starter is wired directly to the battery without intervention from the safety device of the present invention, it can freely draw available current from the battery. In contrast, the selected accessories can draw current from the battery only after it has passed through the circuit breaker of the present invention. The device monitors the battery voltage and if it drops below a predetermined level the circuitry interrupts current to the selected accessories. In this way, no current can be drawn by the accessories and maximum power is available for the starter motor.

Critical accessories, such as hazard flashers, may be wired to bypass the safety device by means of a manual override switch, or by parallel wiring analogous to the starter motor. In such cases, the critical accessories will continue to draw current from the battery even though the predetermined minimum voltage is exceeded.

In order to prevent inadvertent loss of accessories while the engine is running, the circuitry is disabled by a signal from the engine which is indicative that the engine is running. It is desirable to avoid the inadvertent interruption of current to accessories such as lights while the vehicle is in operation. Such a condition could occur, for example, if the recharging system is faulty. Conversely, when the engine is shut off, the disabling signal terminates and current to the accessories is again regulated through the safety device.

In a further embodiment of the present invention, the safety device of the present invention includes a timer which is activated whenever the battery voltage drops below a predetermined level. When the time period set by the timer expires, the timer generates a signal which pulses or deenergizes a solenoid and electrically disconnects the battery from the load.

In a still further preferred embodiment of the present invention, a timer is also employed to electrically disconnect the battery from the car accessories after a predetermined time period. Unlike the previously discussed embodiment of the present invention, however, this embodiment monitors the battery discharge rate and utilizes the battery discharge rate as a signal to set the voltage threshold level at which the time is activated. This allows the battery to be disconnected at lower voltage under heavy load conditions but at a higher voltage due to parasitic loads over an extended period of time.

BRIEF DESCRIPTION OF THE DRAWING

Other features and advantages of the present invention will be more fully understood by reference to the following detailed description when read in conjunction with the accompanying drawing in which like reference characters refer to like parts throughout the several views, and in which.

DETAILED DESCRIPTION OF PREFERRED EMBODIMENTS OF THE PRESENT INVENTION

Figure 1:
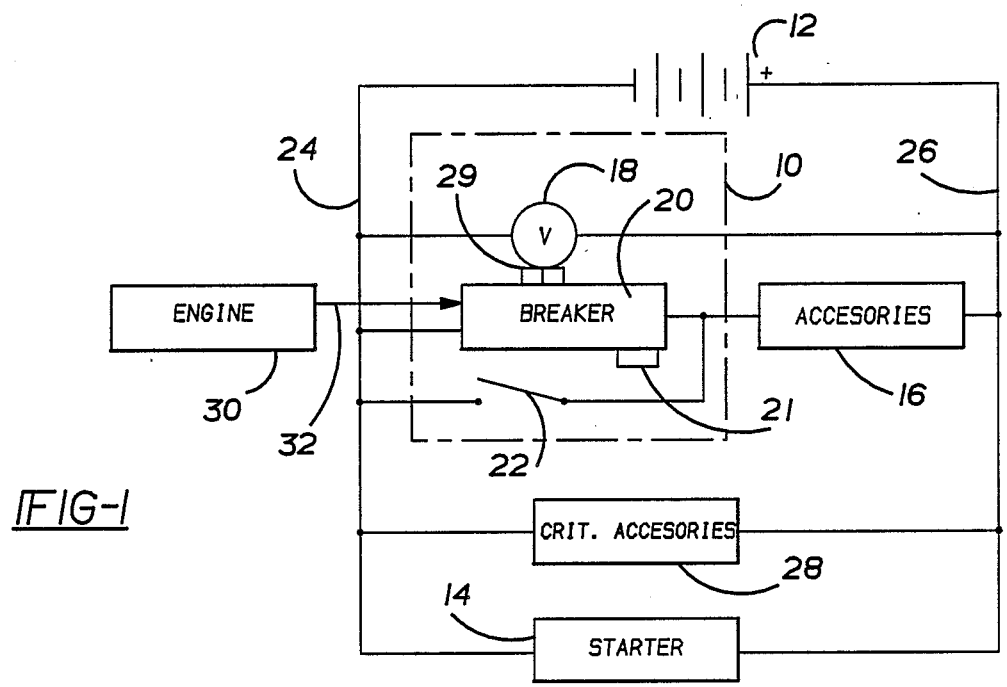
FIG. 1 is a schematic diagram of the safety device according to the present invention.
Figure 2:
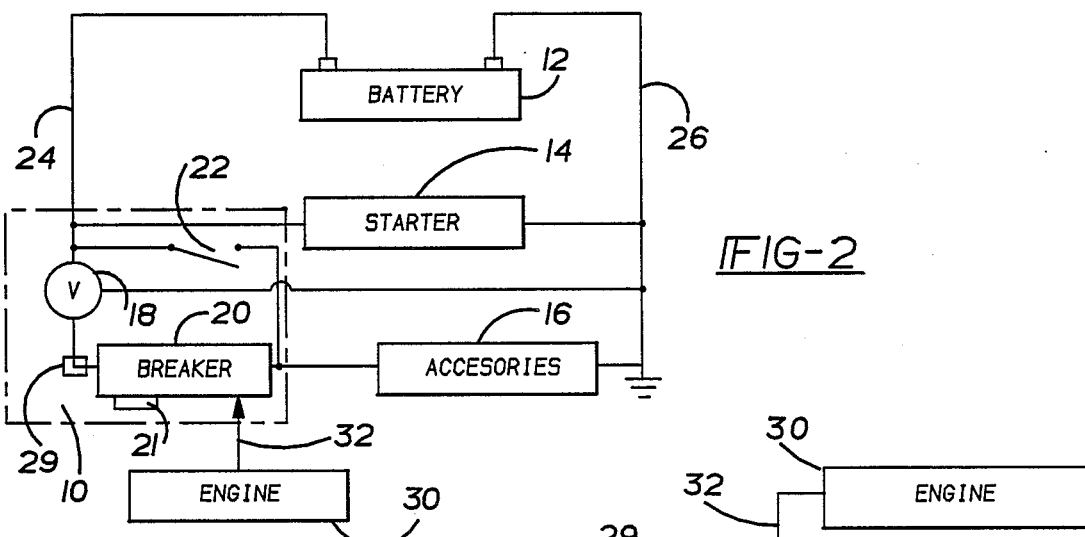
FIG. 2 is a diagrammatic view of a preferred embodiment.

Referring generally to FIGS. 1 and 2, the safety device 10 is thereshown in a circuit including a battery 12, a starter 14 and various accessories diagrammatically indicated as 16 and 28. The term "accessories" as used herein shall include all interior and exterior lights, fan or blower motors, windshield wiper motors, horn relays, radios, tape players and any other automotive electrical equipment which is powered by a car battery. The term "critical accessories" as used herein shall refer primarily to emergency hazard flashers but should be understood to include other accessories which may need to be operated even at the expense of draining the battery so that the car may not start. The safety device 10 comprises a voltmeter 18, a circuit breaker 20, a reset switch 21 and, in a preferred embodiment, a manual override switch 22.

Although the preferred embodiment contemplates use of the device 10 in a conventional automobile, it is to be understood that the device 10 may be used in any motor vehicle, marine vehicle, aircraft, or other vehicle which employs electrical starters.

A conductor 24 conducts current from one terminal of the battery 12, through the voltmeter 18 and back to the other terminal of the battery via return conductor 26. The conductor 24 also provides current from the battery 12 to the breaker 20, one side of the switch 22, and directly to the critical accessories 28 and the starter 14. Return conductor 26 returns current to the battery 12 from each of these components. The circuit breaker 20 is wired in series with selected accessories 16 and is capable of interrupting current to the accessories 16 as will be described hereinafter. Manual override switch 22, when closed, bypasses circuit breaker 20 and provides current directly to the accessories 16 in a manner similar to critical accessories 28.

If the voltmeter 18 measures a voltage less than a predetermined threshold level, it activates the circuit breaker 20 which interrupts current to the accessories 16. In this way, when the potential of the battery 12 decreases to a predetermined voltage minimum, the circuit containing the accessories 16 is interrupted and can draw no current. Therefore, maximum current is available for the starter 14 and for the critical accessories 28.

The manual override switch 22 can be closed if an emergency situation requires that any of the accessories 16 remain operational. In addition, a reset switch 21 reactivates the breaker 20 and restores current flow to the accessories 16.

The minimum threshold voltage is preferably selected so that the battery 12 has sufficient reserve power to drive the starter motor 14 in order to start the engine. Since the power required to drive the starter motor 14 can vary depending on external circumstances such as temperature and battery age, it is preferable to include adjustable means 29 for variably selecting the predetermined minimum voltage. This can be accomplished by varying the sensitivity of the circuit breaker 20 or by varying the activation response level of the voltmeter 18, according to means known by those skilled in the art. Thus, the device 10 is self preserving because the minimum voltage is selected so that the battery 12 has sufficient power to restart the mechanism which recharges it regardless of the external circumstances.

In some cases it will be desirable to wire certain critical accessories 28 directly to conductor 24 so as to bypass the safety device 10. For example, the hazard flashers on the automobile are preferably wired as a critical accessory 28 even though there is a risk that continued operation of critical accessories 28 will cause the voltage potential of the battery 12 to drop below the selected minimum threshold level. This would enable a disabled vehicle on the shoulder of a road to maintain its hazard flashers for the maximum time period possible.

In a preferred embodiment, the circuit breaker 20 is disabled when the engine is running. This is an additional safety mechanism which prevents the unintended interruption of accessories 16, such as headlights, while the engine is running. In a normally operating vehicle, if the engine is running, the battery 12 is being recharged and the minimum threshold voltage will always be exceeded. However, if the recharging system is faulty, the accessories 16 could drain the battery until the minimum voltage is reached even though the engine is running.

Therefore, in the preferred embodiment, the engine 30 produces a signal 32 which is indicative that the engine is running. The signal 32 can be any signal representative of a running engine condition, such as the presence of an electrical spark, a rotation of a shaft or flywheel or a vacuum at the manifold, for example. The breaker 20 can be adapted to read and interpret any such signal in a manner well known in the art. Thus, the disable feature prevents the operation of a circuit breaker 20 when the engine 30 is running. Conversely, when the engine 30 is again stopped, the disabling signal 32 is removed and circuit breaker 20 is free to operate in the manner previously described.

Referring to FIG. 2, the device 10 is thereshown at a location remote from the battery. For example, the device 10 could be installed inside the vehicle on or under the dashboard. In this embodiment, the voltmeter 18 may be monitored directly if desired.

Figure 3:
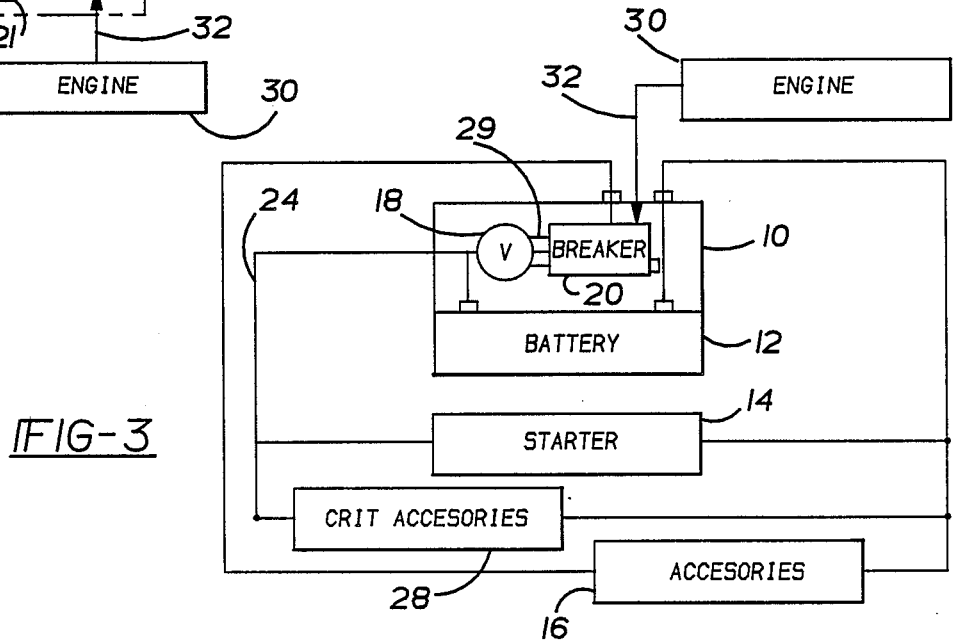
FIG. 3 is a diagrammatic view of a second preferred embodiment of the present invention.

Referring now to FIG. 3, an embodiment of the safety device 10 is thereshown adjacent the battery 12. In this embodiment, reading of the voltmeter 18 is not easily accomplished and automatic activation of the circuit breaker 20 by the voltmeter 18 is preferred. In other respects this embodiment is similar to those previously described and therefore will not be described in additional detail.

In each of the embodiments, the manual override switch 22 and the means 29 for selecting the predetermined minimum voltage are on the vehicle at a location convenient for the operation.

Having thus described the structural features of the present invention, its operation can be easily understood. The safety device 10 is designed to automatically interrupt the current to selected accessories 16 whenever the voltage potential of the battery 12 drops below a preselected minimum level. However, if operation of a certain accessory 16 is still desired, manual override switch 22 may be closed to supply current to the accessories 16. Although the preferred embodiment of the safety device 10 is arranged to operate automatically, it would be obvious to provide for manual operation by visual inspection of the voltmeter 18 and manual operation of the circuit breaker 20.

Additionally, the present invention enables a user to intentionally leave on and utilize a given accessory for a limited time. The device 10 will automatically shut off the accessory when the battery 12 reaches the predetermined level.

Figure 4:
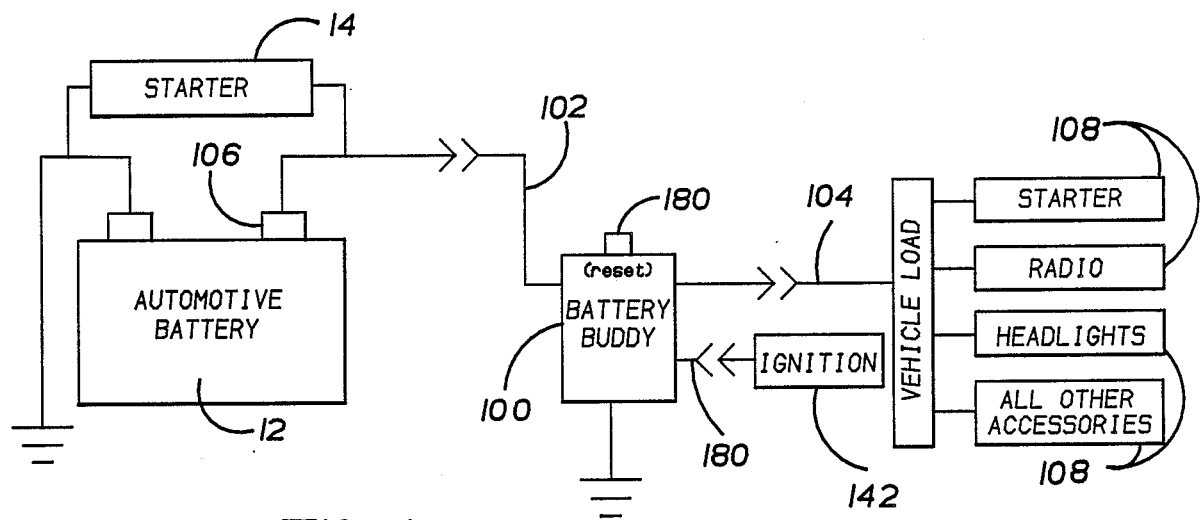
FIG. 4 is a diagrammatic view illustrating the operation of a further preferred embodiment of the present invention.
Figure 5:
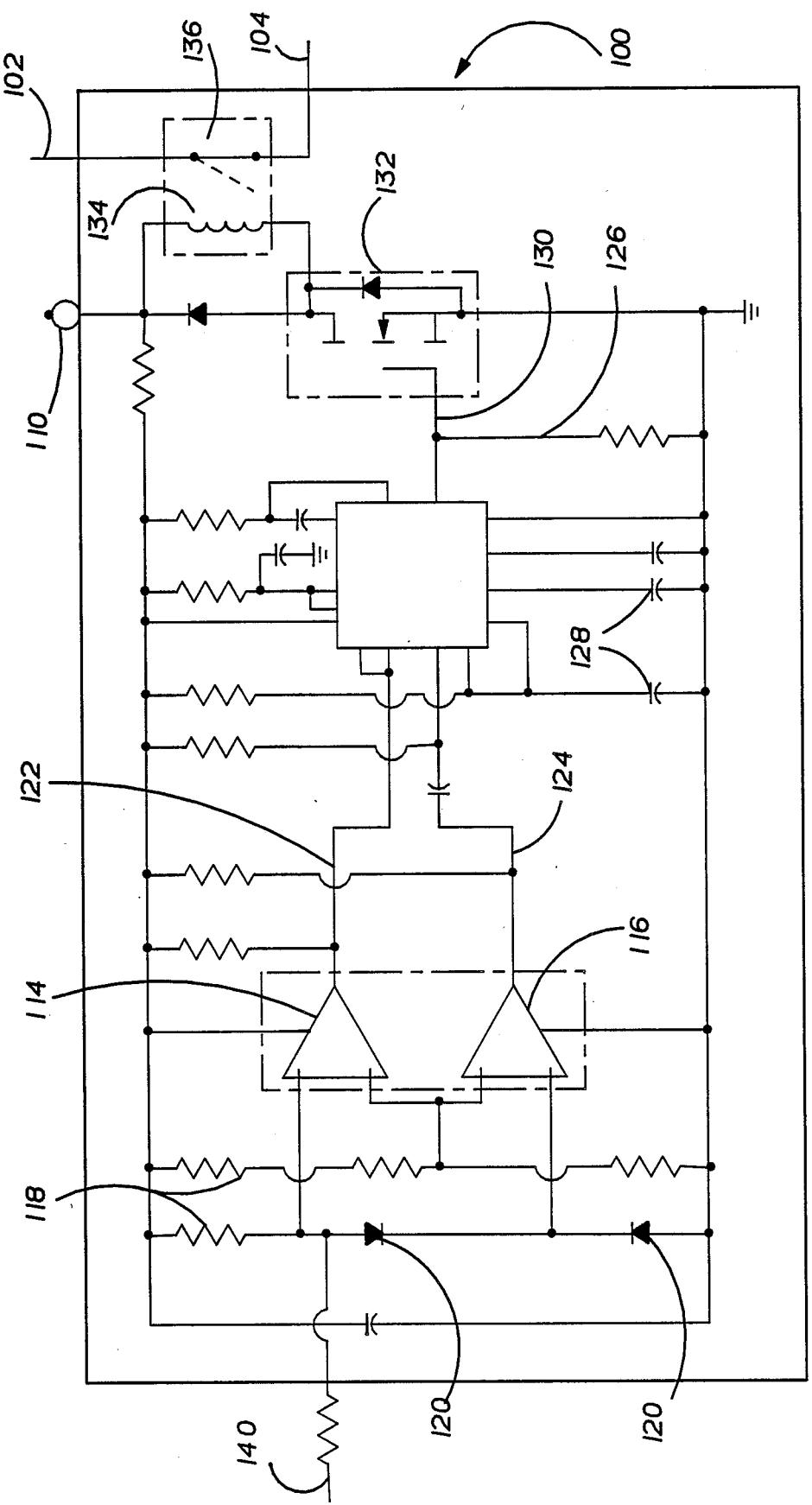
FIG. 5 is a schematic view illustrating the third preferred embodiment of the present invention.

With reference now to FIGS. 4 and 5, a still further embodiment of the safety device 100 of the present invention is thereshown electrically connected by lines 102 and 104 in series between the anode 106 of the battery 12 and a plurality of automotive accessories 108. In a manner to be shortly described, the device 10 either electrically connects or disconnects the electric lines 102 and 104 from each other. With the lines 102 and 104 electrically connected, the automotive accessories 108 are operable. Conversely, with the lines 102 and 104 disconnected, the accessories 108 cannot be operated. Alternatively, the starter 14 can be directly connected across the battery 14 as shown in FIG. 4 or as an accessory 108. The wiring of the starter 14 directly to the battery 12 would be used in original equipment manufacturer (OEM) situations and as an accessory 108 in aftermarket applications.

Referring now to FIG. 5, the safety device 100 is thereshown in greater detail and comprises a terminal 110 which is electrically connected to the battery anode 106. Consequently, the voltage of the car battery is present at the terminal 110.

The voltage level from terminal 110 is fed as an input signal to two comparators 114 and 116 through resistors 118 and diodes 120. The resistors 118 and diodes 120 are arranged so that the first comparator 114 generates a signal on its output 122 when the voltage at the terminal 110 falls below a predetermined threshold, e.g. 11.8 volts. Similarly, the second comparator 116 generates a signal on its output 124 whenever the voltage on terminal 110 falls below a second threshold, e.g. 11.3 volts.

Still referring to FIG. 5, the outputs 122 and 124 from the comparators 114 and 116 are fed as input signals to a timer 126. A signal on line 122 resets and energizes or "turns on" the timer 126 while a signal on line activates the timer countdown for the timer 126. Appropriate timing circuitry 128 is associated with the timer 126 so that, following activation by the comparator 116, the timer generates a signal on its output 130 after a preset time period, e.g. three minutes. Activation of the timer 126 occurs whenever the comparators 122 and 124 sequentially generate output signals.

The timer output 130 is fed as a signal to the gate of a MOSFET 132 which is connected in series with the battery terminal 110 and a latching coil 134 of a normally closed solenoid switch 136. The solenoid switch 136 is connected in series between the lines 102 and 104 (see also FIG. 4).

A signal on line 140 from the ignition circuitry 142 of the engine is also coupled as an input signal to one input of the comparator 116 of the safety device 100. When active, the ignition circuit 142 generates a signal on line 140 which prevents the comparator 114 from generating a signal on its output 122 and thus prevents the comparator 114 from energizing the timer 126.

In operation, and assuming that the ignition circuit 142 is inactive, the voltage from the battery 12 is fed as an input signal on terminal 110 to the comparators 114 and 116. Assuming that the voltage level is above a preset amount, the timer 126 is inactive so that the MOSFET 132 is in an off condition.

Since the MOSFET 132 is in an off condition, the solenoid latch coil 134 is deenergized. With the coil 134 deenergized, the normally closed solenoid switch 136 remains in a closed position thereby electrically connecting the electric lines 102 and 104 so that the accessories 108 can be operated as desired.

Assuming that the battery voltage falls below a preset level, the comparator 114 first energizes the timer 126 and the comparator 116 then activates the timer and initiates the timer countdown. Following the expiration of a preset time period as defined by the timing circuitry 128, the timer 126 generates an output pulse on its output 130 to the MOSFET 132 thus activating or turning on the MOSET 132. The latch coil 134 then energizes and opens the solenoid switch 132 to the open position as shown in phantom line. When this occurs, the lines 102 and 104 are electrically disconnected from each other thereby disconnecting the accessories 108 from the battery 114.

Still referring to FIG. 5, a signal representative of the state of charge of the battery can alternatively be coupled as an input signal to terminal 110. Thus, the timer 126 is activated whenever the state of charge of the battery falls below preset thresholds.

As is hereinafter described in greater detail, the state of charge of the battery is a value indicative of the available energy of the battery. One means for determining the state of charge of the battery is disclosed in FIGS. 6 and 9 and is hereinafter more fully described. That description is incorporated by reference.

In a modification, an alarm can also be activated at the time the countdown is initiated. This alarm would warn the owner (if he or she is in the immediate area) to start the vehicle before the expiration of the preset time period. Such an alarm would be particularly useful when the vehicle owner is intentionally using the vehicle battery to power electrical accessories, such as lights, since the alarm would warn the owner to restart the vehicle, and thus recharge the battery, before the solenoid switch disables all power to the accessories.

Figure 7:
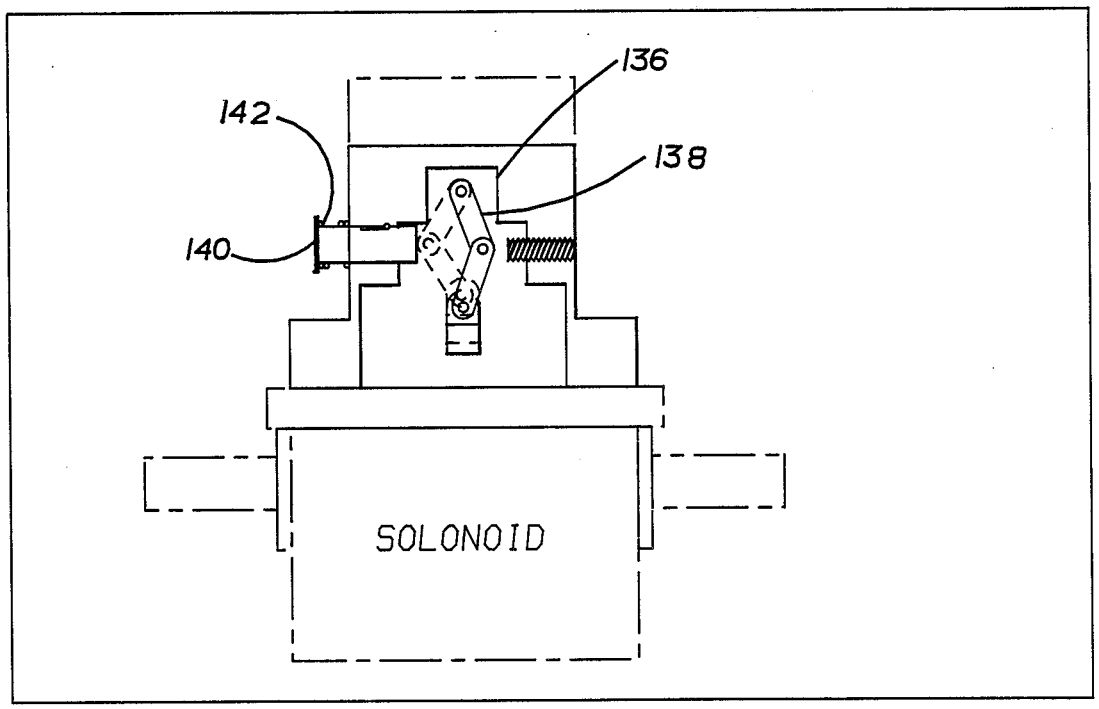
FIG. 7 is a side view illustrating one component of a preferred embodiment of the present invention.

With reference now to FIG. 7, the solenoid 136 preferably includes a mechanical assembly having an "over center" mechanism 138. Upon activation of the latch coil 134, the over center mechanism 138 moves from its closed position, shown in solid line, to its open position, shown in phantom line. Thereafter, the solenoid switch 136 will remain in its open position until the solenoid 136 is reset by manually depressing a button 140. A spring 142 preferably urges the button 140 to an open position thereby preventing accidental reset of the solenoid switch 136 when opened.

Figure 8:
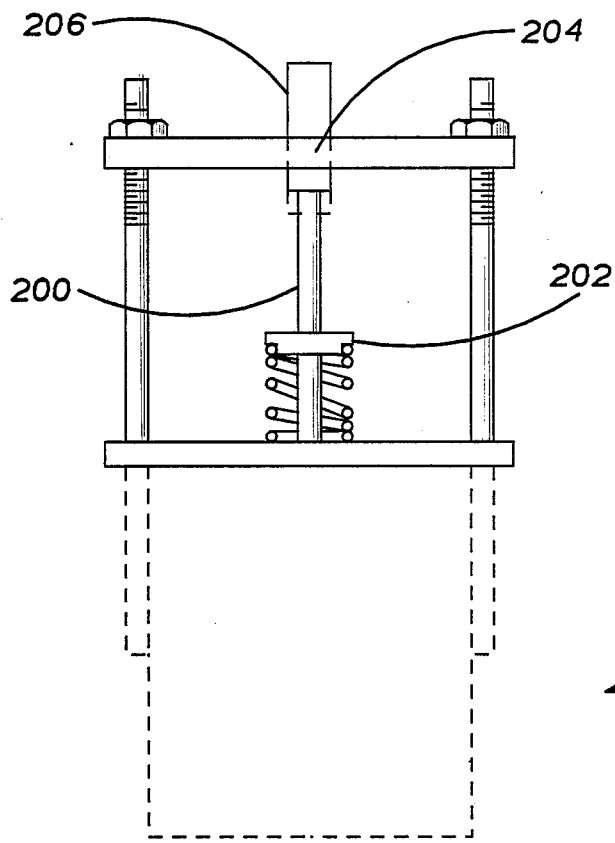
FIG. 8 is a view similar to FIG. 7 but showing a modification thereof.

With reference now to FIG. 8, a further embodiment of the solenoid switch 136 is thereshown having a switch actuator 200 movable between a lower position, shown in phantom line, and an upper position, shown in solid line. In its lower position the switch 136 is closed, thus powering the accessories. Conversely, in its upper position the switch 136 is open thus disconnecting power from the accessories. A spring 202 urges the switch actuator 200 towards its upper position.

A ratchet mechanism 204 having a button 206 moves the actuator 200 alternately between its upper and lower position upon each depression of the button 206. The ratchet mechanism 204 is like that found in ball point pens so that a further description is unnecessary. Furthermore, the button 206 can be mechanically depressed or, alternatively, a solenoid can be used to depress the button 206.

The time delay provided by the timing mechanism 126 is advantageous in that it prevents undesirable activation of the timer 126, together with opening of the switch 136, which might occur during prolonged cranking, especially in cold weather. Such cranking of the engine could reduce the battery voltage to less than the preset voltage level thus activating the timer 126. Such cranking, however, would not last for more than the time delay of the timer 126 thus avoiding disconnection of the accessories 108 from the battery 12.

Figure 6:
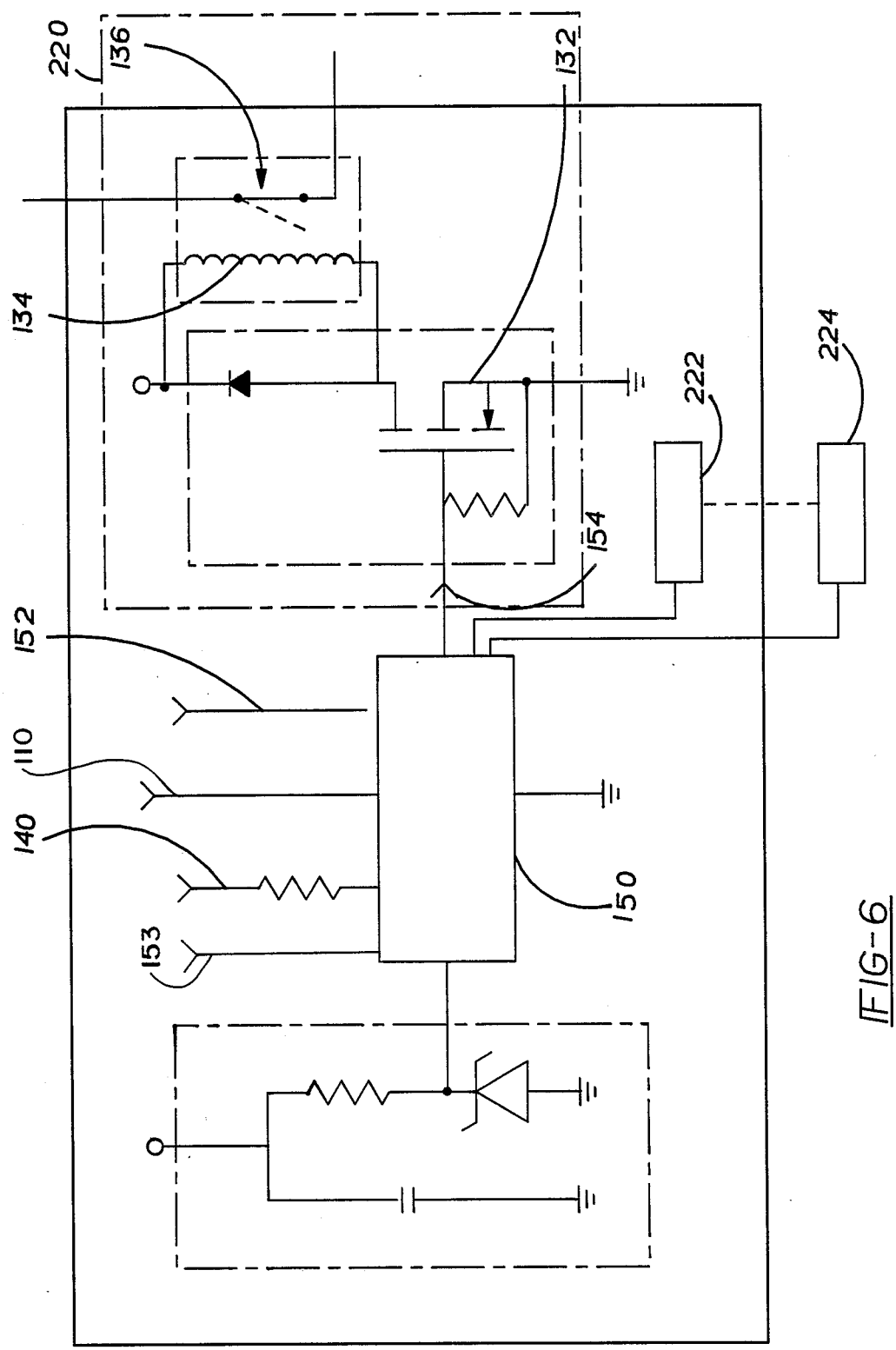
FIG. 6 is a view similar to FIG. 5 but illustrating yet another preferred embodiment of the present invention.

With reference now to FIG. 6, a still further embodiment of the present invention is thereshown in which an integrated microprocessor circuit 150 replaces the timer 126 and comparators 114 and 116 of the FIG. 5 embodiment, together with their associated circuitry. The integrated circuit 150 receives an input signal from the voltage terminal 110 indicative of the battery voltage and a signal on line 153 indicative of the rate of battery discharge. Additionally, the circuit 150 receives an input signal on line 152 representative of the temperature of the battery as well as a signal on line 140 from the ignition circuitry 142.

As is well known, the "state of charge" of the battery is a value indicative of the available energy of the battery. The state of charge varies as a function of the battery temperature, rate of discharge of the battery and battery voltage and the microprocessor is programmed to determine the state of charge of the battery from its input signals. For example, the microprocessor can use a conventional loop up table to determine the state of charge of the battery based upon the battery voltage, temperature and rate of battery discharge. The battery rate of discharge can be detected by any conventional means, such as a transducer having an output representative of the rate of discharge.

In the preferred embodiment of the invention, the microprocessor (or other type device such as ASIC type or solid state technology) continuously monitors the state of charge of the battery. When the state of charge of the battery falls below preset levels, the microprocessor 150 sequentially shuts off banks 220, 222, 224 (FIG. 6) of accessories in order to conserve battery energy.

A separate solenoid switch 136 is associated with each bank 220, 222, 224. For example, the vehicle lights may form the first bank 220 of accessories, the vehicle passenger compartment accessories may form the second bank 222 while the ignition system may form the third bank 224. Thus, if the state of charge of the battery falls below a first level, the device disconnects the vehicle lights. If the state of charge continues to fall below a second level, the device disconnects the passenger compartment accessories while, finally, if the state of charge falls below a third level, the device disconnects the clock computer or other memory type device. The device can include fewer or more than three banks 220, 222, 224.

Figure 9:
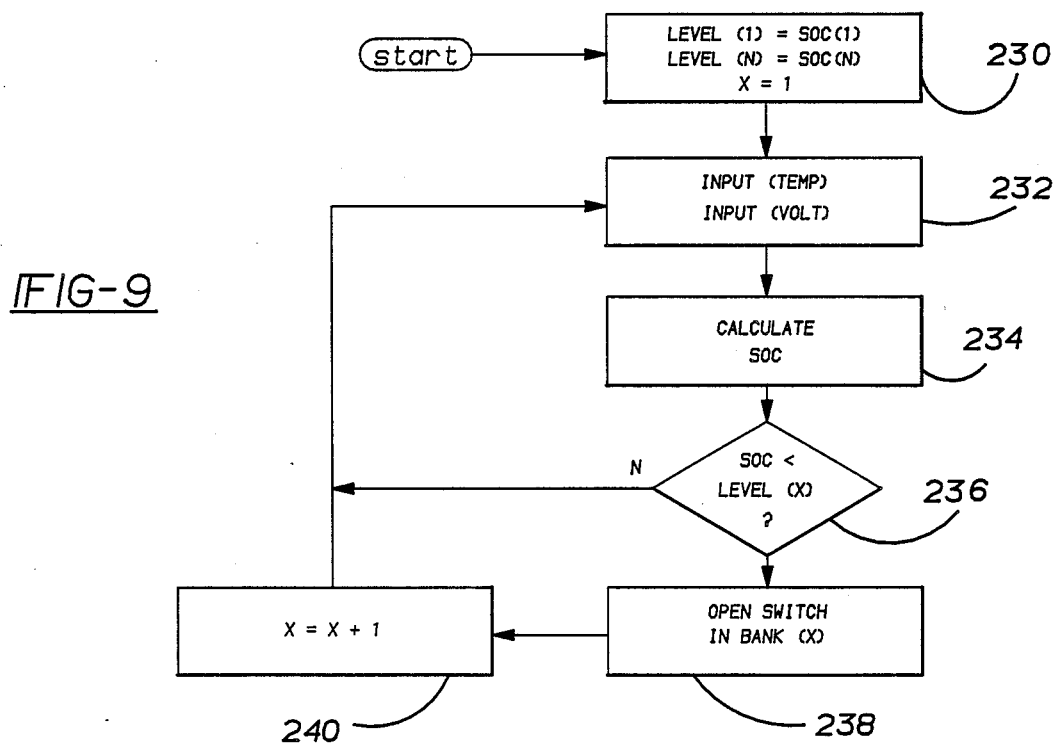
FIG. 9 is a flow chart illustrating the operation of the FIG. 6 embodiment of the invention.

A program for the microprocessor is shown in FIG. 9. At step 230, the variable "X" is initialized to the value 1 and the three preset state of charge levels at which the banks 220, 222, 224 are activated are set.

Step 230 then exits to step 232 where the microprocessor 150 inputs the battery temperature and voltage and then to step 234 where the microprocessor 150 calculates the state of charge (SOC) of the battery. Step 234 then branches to step 236.

At step 236, the microprocessor 150 compares the SOC with the level (X). If the SOC is greater than level (X), then step 236 branches to step 232 where the above process is repeated.

Conversely, if the SOC is less than level (X), step 236 branches to step 238 where the solenoid switch bank (X) is opened. The variable "X" is then incremented at step 240 and the program then branches to step 232 where the above steps are repeated.

The ability of the integrated circuit 150 to adjust the voltage trigger level at which the battery is disconnected from the accessories 108 allows the battery to be disconnected at a lower voltage under heavy load conditions and at a higher voltage due to parasitic conditions that exist over an extended period of time. Similarly, a signal on line 140 will disable the integrated circuit 150 to prevent disconnection of the battery from the accessories during operation of the engine.

Although the device 100 of the present invention has been described as being separate from the battery, it will be understood that the device 100 may be integrally constructed within the battery without deviation from the spirit or scope of the present invention.

The foregoing detailed description of the preferred embodiment has been given for clearness of understanding only and no unnecessary limitations should be understood therefrom. Such modifications will be obvious to those skilled in the art to which the invention pertains, without deviation from the spirit of the invention as defined by the scope of the appended claims.

I claim:

1. For use in conjunction with a vehicle having a battery, an ignition system, and at least one electrically powered accessory connected to the battery, a device for electrically disconnecting the battery from the accessory whenever the battery energy falls below a predetermined value comprising:

a normally closed switch connected in series between the battery and the accessory, and
means for opening said switch comprising:
means for sensing a battery characteristic indicative of battery drain and for generating an output signal whenever an energy capacity of said battery falls below said predetermined value,
timing means responsive to said sensing means output signal for generating a timing output signal a predetermined time period after said sensing means output signal, and
means responsive to said timing means output signal for opening said switch,
wherein said sensing means comprises means for determining the rate of discharge of the battery and for adjusting a threshold level at which said timing means is activated as a function of the rate of discharge of the battery.

2. The invention as defined in claim 1 wherein said sensing means comprises a voltage comparator.

3. The invention as defined in claim 2 wherein said sensing means comprises two voltage comparators.

4. The invention as defined in claim 1 wherein said timing means comprises a timer.

5. The invention as defined in claim 1 wherein said opening means comprises a MOSFET, an electrical switch and a latch coil connected in series with the battery, said timing means output signal being connected to a gate on said MOSFET so that said timing means output signal turns on said MOSFET and energizes said latch coil, said latch coil opening said switch upon energization.

6. The invention as defined in claim 5 wherein said switch comprises reset means and an over center mechanism movable between an open and closed position which retains said switch in an open position until activation of said reset means.

7. The invention as defined in claim 6 wherein said reset means comprises a button which, upon depression, mechanically moves said over center mechanism from its open and to its closed position.

8. The invention as defined in claim 1 wherein said rate sensing means comprises a programmed integrated microprocessor circuit.

9. The invention as defined in claim 8 wherein the vehicle comprises a plurality of accessories arranged in at least two banks, one of said normally closed switches being associated with each bank, means for sequentially opening said switches so that one switch opens when the threshold level attains a first level and the other switch opens when the threshold level attains a second level.

10. The invention as defined in claim 1 and further comprising means for deactivating said electrical disconnecting means whenever the ignition system is active.

11. The invention as defined in claim 1 wherein said sensing means comprises a first and second comparator, said first comparator generating a first output signal to said timer means which resets and energizes said timing means when the battery voltage falls below a first voltage level, said second comparator generating an output signal which activates and initiates the beginning of said predetermined time period when the battery voltage falls below a second voltage level, said first voltage level being greater than said second voltage level.

12. The invention as defined in claim 5 wherein said switch comprises reset means having a switch actuator, a button and a ratchet mechanism interposed between said button and said switch actuator.

13. The invention as defined in claim 1 wherein said means for determining the state of charge further comprises means for determining the rate of discharge of the battery.

14. The invention as defined in claim 13 wherein said means for determining the state of charge of the battery comprises means for determining the temperature of the battery.

15. For use in conjunction with a vehicle having a battery, an ignition system, and at least one electrically powered accessory connected to the battery, a device for electrically disconnecting the battery from the accessory whenever the battery energy falls below a predetermined value comprising:
a normally closed switch connected in series between the battery and the accessory, and
means for opening said switch comprising:
means for sensing a battery characteristic indicative of battery drain and for generating an output signal whenever an energy capacity of said battery falls below said predetermined value,
timing means responsive to said sensing means output signal for generating a timing output signal a predetermined time period after said sensing means output signal, and
means responsive to said timing means output signal for opening said switch,
wherein said sensing means comprises a first and second comparator, said first comparator generating a first output signal to said timer means which resets and energizes said timing means when the battery voltage falls below a first voltage level, said second comparator generating an output signal which activates and initiates the beginning of said predetermined time period when the battery voltage falls below a second voltage level, said first voltage level being greater than said second voltage level.

16. The invention as defined in claim 15 wherein said sensing means comprises a voltage comparator.

17. The invention as defined in claim 16 wherein said sensing means comprises two voltage comparators.

18. The invention as defined in claim 15 wherein said timing means comprises a timer.

19. The invention as defined in claim 15 wherein said opening means comprises a MOSFET, an electrical switch and a latch coil connected in series with the battery, said timing means output signal being connected to a gate on said MOSFET so that said timing means output signal turns on said MOSFET and energizes said latch coil, said latch coil opening said switch upon energization.

20. The invention as defined in claim 19 wherein said switch comprises reset means and an over center mechanism movable between an open and closed position which retains said switch in an open position until activation of said reset means.

21. The invention as defined in claim 20 wherein said reset means comprises a button which, upon depression, mechanically moves said over center mechanism from its open and to its closed position.

22. The invention as defined in claim 15 wherein said sensing means comprises means for sensing the state of charge of the battery and for adjusting a threshold level at which said timing means is activated as a function of the state of charge of the battery.

23. The invention as defined in claim 22 wherein said rate sensing means comprises a programmed integrated microprocessor circuit.

24. The invention as defined in claim 23 wherein the vehicle comprises a plurality of accessories arranged in at last two banks, one of said normally closed switches being associated with each bank, means for sequentially opening said switches so that one switch opens when the threshold level attains a first level and the other switch opens when the threshold level attains a second level.

25. The invention as defined in claim 22 and further comprising means for deactivating said electrical disconnecting means whenever the ignition system is active.

26. The invention as defined in claim 19 wherein said switch comprises reset means having a switch actuator, a button and a ratchet mechanism interposed between said button and said switch actuator.

* * * * *